Sept. 8, 1964  J. J. TOROK  3,148,047
PRESS-MOLDING MACHINE WITH HEAT FLOW CONTROL
Filed Dec. 30, 1959  2 Sheets-Sheet 1
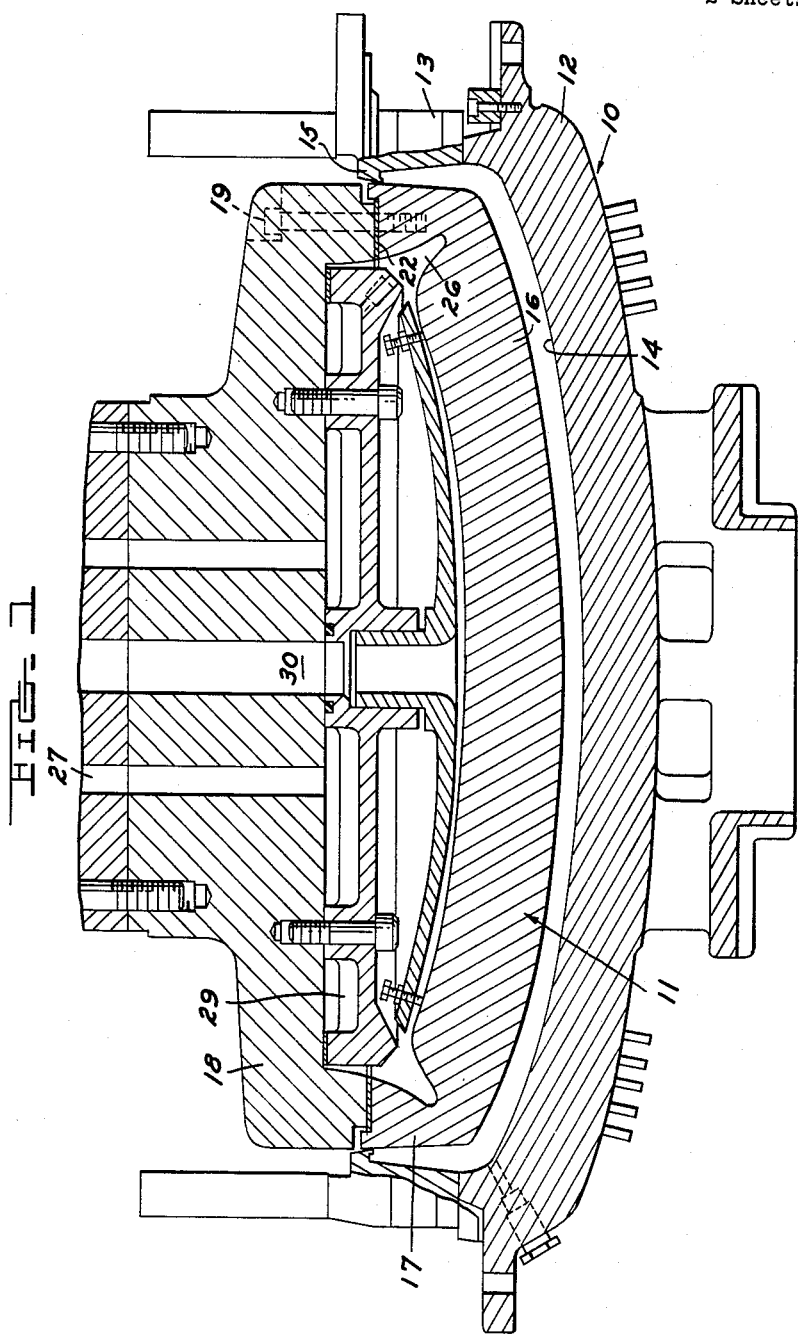
INVENTOR.
JULIUS J. TOROK
BY W. A. Schaich &
E. J. Holler
ATTORNEYS Sept. 8, 1964  J. J. TOROK  3,148,047
PRESS-MOLDING MACHINE WITH HEAT FLOW CONTROL
Filed Dec. 30, 1959  2 Sheets-Sheet 2
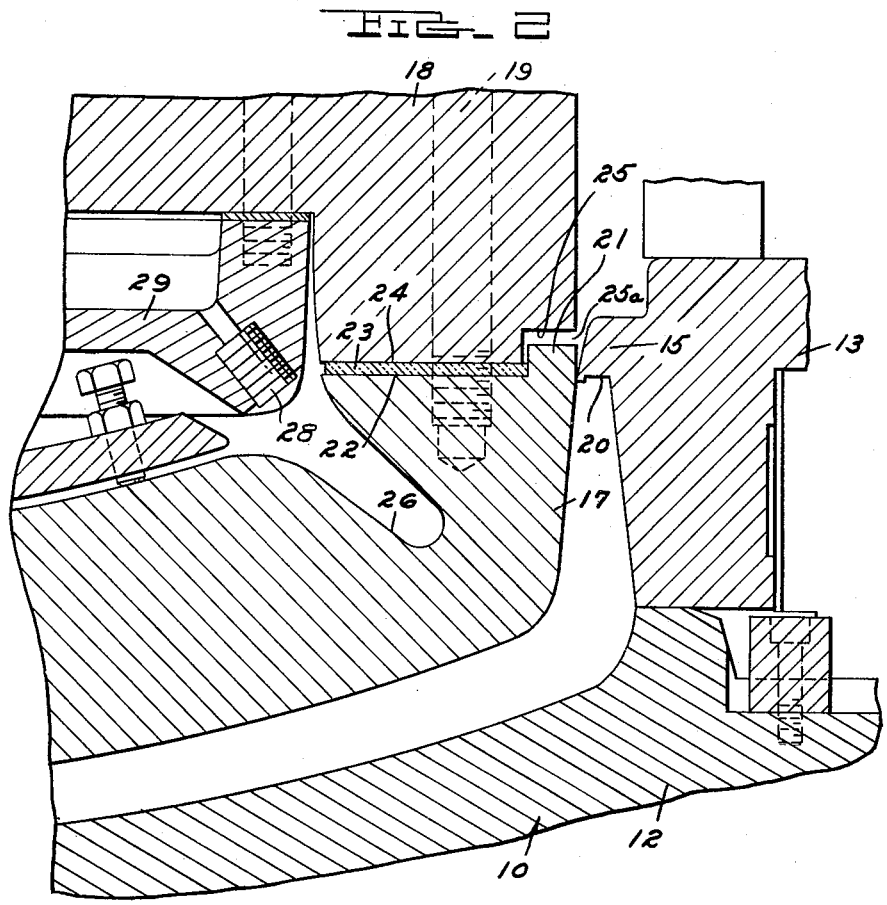
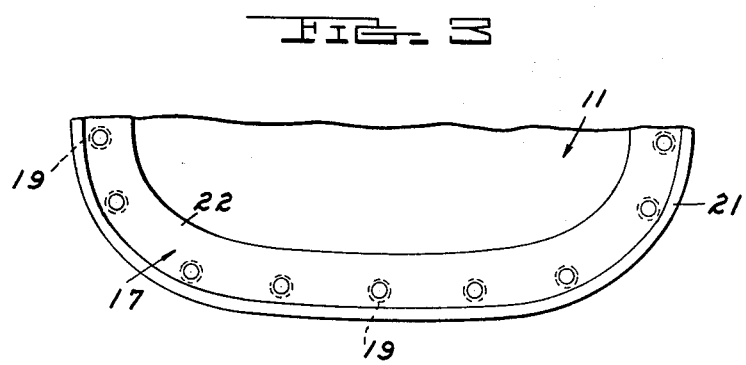
INVENTOR.
JULIUS J. TOROK
BY
ATTORNEYS ns
3,148,047
PRESS-MOLDING MACHINE WITH HEAT FLOW CONTROL Julius J. Torok, Toledo, Ohio, assignor, by mesne assignments, to Owens-Illinois Glass Company, Toledo, Ohio, a corporation of Ohio
Filed Dec. 30, 1959, Ser. No. 862,825
6 Claims. (Cl. 65—305)

This invention relates to forming glass articles and particularly to forming glass articles having a base portion and a peripheral flange portion.

One of the methods of making glass articles is by pressing a gob of hot molten glass in a mold having an internal molding surface corresponding to the external configuration of the article to be formed. The pressing is done by moving a plunger downwardly into contact with the glass to displace the glass to form the glass article. The plunger has an external molding surface corresponding to the internal configuration of the article which is to be formed. When utilizing this method to form glass articles, it is extremely important to control the temperature of the glass forming surfaces. If the glass forming surfaces are too hot, the glass will stick thereto and if the glass forming surfaces are too cold, the glass will crizzle or form what are commonly known as "chill wrinkles." It is also important that on the whole the surfaces do not operate at too high a temperature since such a condition is found to increase the cycle time.

It can thus be seen that it is desirable and necessary to operate the glass forming surfaces at temperatures between the extremes which will cause sticking or crizzling in order that the glass articles may be successfully formed at low cost. Since there are other variables such as glass temperature and atmospheric conditions which affect the temperatures of the glass forming surfaces, it is preferred to operate the glass forming surfaces at a much narrower range of temperatures so that the glass forming surfaces are well within the extreme limits of temperature thereby providing ample working tolerance for the variables which are more difficult to control.

When such a method of pressing a gob of glass is used in making a glass article which has certain portions thereof connected by sharply curved portions, such as glass block halves and television tube face plates which comprise a base portion and a flange portion connected to the base portion by relatively sharply curved portions, the problem of maintaining a uniform temperature on the molding surfaces becomes more difficult. There is a tendency for the glass surfaces in the area of juncture of the base portion and flange portion to be extremely hot relative to the median mold working temperature and for the glass forming surfaces on the upper edge of the flange portion to be extremely cold relative to the median mold working temperature. This is accentuated where efforts are made to lower the temperature in the area of juncture since such lowering of the temperature tends to further lower the temperature of the glass forming surface adjacent the upper end of the flange portion.

It is an object of this invention to provide an apparatus for forming glass articles having a base and peripheral flange wherein the glass forming surfaces of the plunger do not exceed the limits of working temperature of the glass; wherein the tendency of the glass to stick or to become crizzled is substantially lessened.

In the drawings:

FIG. 1 is a sectional elevational view of a glass forming apparatus for performing the method embodying the invention.

FIG. 2 is a fragmentary sectional view on an enlarged scale of a portion of the apparatus shown in FIG. 1.

FIG. 3 is a fragmentary top plan view of the plunger shown in the apparatus of FIG. 1 removed from the apparatus.

Referring to FIG. 1, a mold 10 of heat conducting material comprises a base section 12 and a peripheral or ring section 13 defining an internal molding surface 14 which has a configuration corresponding to the external configuration of the glass article which is to be formed, which article has a base portion and a peripheral flange portion of relatively small height relative to the overall dimensions of the base portion. Ring section 13 includes an inwardly extending peripheral lip 15 which defines the upper end of the flange which is to be formed on the glass article.

Plunger 11 is made of heat conducting material and is adapted to move downwardly into mold 10 to press a gob of glass and includes a base portion 16 and a flange portion 17. Plunger 11 is mounted on a head 18 by bolts 19 threaded into flange portion 17 of plunger 11. Bolts 19 are preferably made of a metal having low thermal conductivity such as No. 309 stainless steel. As shown in FIG. 2, the upper end of the flange portion 17 has the major portion of the area thereof lying in a plane which is at the same or lower height as the lower edge 20 of the lip 15. Specifically, as shown in FIG. 2, the upper end of flange portion 17 is provided with a peripheral bead 21 at its radially outermost periphery which bead extends upwardly above the lower edge 20 of lip 15 and a substantially flat surface 22 extending radially inwardly from the bead 21 and lying in a plane which is in the same plane with the lower edge 20 of lip 15 or lower. A gasket 23 of insulating material such as graphite impregnated asbestos is interposed between the surface 22 and a corresponding surface 24 on the head 18. The head 18 also includes a peripheral notch or groove 25, all portions of which are spaced from the bead 21 by air gap 25a so that there is no metal to metal contact between the flange portion 17 and the head 18.

In order to provide the desired temperature control, the major portion of the upper surface of the flange portion 17 should lie substantially at or below the lower edge 20 of lip 15. Where the heat input in any area of the flange is less, for example, in the short side of a rectangular plunger, the upper surface of the flange portion 17 is preferably at a lower level than the plane of the lower edge 20 of lip 15. Where the heat input is greater in any area of the flange, for example, in the corners of a rectangular plunger, the upper surface of the flange portion 17 overlying the corner is preferably higher than the upper surface of the flange portion in the sides of the plunger.

The specific internal construction of the plunger 11 may vary but is preferably of the type disclosed and claimed in my copending application Serial No. 763,351, titled "Forming Glass Articles," filed September 25, 1958. Such a plunger 11 includes a base portion 16 which has a substantially uniform thickness and a flange portion 17 extending around the periphery of the base portion and forming on the order of 90° relative thereto. A peripheral groove 26 is provided in the area of juncture of the base portion and flange portion on the side of the plunger opposite the molding surface. The plunger is preferably cooled by a liquid coolant supplied through openings 27 in head 18 against and through nozzles 28 in a distributor 29 mounted on head 18 against the base of the groove 26 at an angle to a radial line intersecting the axis of the plunger so that a rotary motion is imparted to a liquid coolant. The liquid coolant thereafter flows along the base portion 16 of the plunger and is removed through an axial opening 30 in head 18. This method and apparatus for cooling the plunger 12 is more completely disclosed and claimed in my copending application Serial No.

763,384, titled "Forming Glass Articles," filed September 25, 1958. The coolant is removed through the outlet 30.

When a plunger embodying my invention is utilized, it is found that the outer surface of the flange portion 17 operates at a substantially uniform temperature above that at which crizzling or checking of the glass article results.

The beneficial results achieved by utilizing a plunger construction as set forth above are obtained, in my opinion, because there is no direct path of flow of heat in a direction vertically away from the flange but on the contrary because the major portion of the surface of the upper ends of the flange 17 lies substantially at or below the upper edge of the glass article, defined by the surface 20 on lip 15, and is relatively insulated from support 18 by gasket 24, air gap 25a and low conductivity bolts 19, heat can only flow laterally and horizontally through the flange. Thus, heat is not dissipated upwardly into the head and undue cooling of the flange is not achieved.

When used in connection with the plunger construction including the slot and the particular cooling means that cools the internal surface of the plunger a substantially isothermal operation of the plunger results.

Although the apparatus has been described in connection with a generally rectangular article or a generally rectangular mold and plunger, it should be apparent that it is also applicable to articles which are of other cross section.

I claim:

1. In an apparatus for forming a glass article having a base and a peripheral flange by pressing, said apparatus including means for moving a plunger downwardly into contact with the gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, said mold having an uppermost portion extending radially inwardly to define the upper edge of the glass article, and means defining a chamber adjacent the internal surface of the base portion and flange portion through which liquid coolant is circulated to cool the plunger, the improvement wherein the uppermost portion of the mold defining the upper edge of the glass article lies on a level at least as great as the major portion of the upper edge of the flange portion of the plunger, a support for said plunger, means for mounting said plunger on said support, and heat insulating means interposed between said support and the major portion of the upper edge of the flange portion of said plunger so that substantially all heat flow is laterally through the flange portion and a minimum flow of heat occurs vertically of said flange portion to said support.

2. In an apparatus for forming a glass article having a base and a peripheral flange by pressing a plunger downwardly into contact with the gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, and means defining a chamber adjacent the internal surface of the base portion and flange portion through which liquid coolant is circulated to cool the plunger, the improvement wherein the upper edge of the flange portion of the plunger is formed with a portion extending upwardly beyond the uppermost part of the glass contacting area thereof, the remainder of the upper edge of the flange portion radially inwardly of said upwardly extending portion being on a level substantially the same as the upper edge of the glass contacting area, a support for said plunger, means for mounting said plunger on said support with the surfaces of the upper edge thereof in spaced heat insulating relationship to said support, and heat insulating means interposed between said support and the remainder of the upper edge of the flange portion of said plunger so that substantially all heat flow is laterally through the flange portion and a minimum flow of heat occurs vertically of said flange portion to said support.

3. In an apparatus for forming a glass article having a base and a peripheral flange by pressing, said apparatus including means for moving a plunger downwardly into contact with the gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, said mold having an uppermost portion extending radially inwardly to define the upper edge of the glass article, and means defining a chamber adjacent the internal surface of the base portion and flange portion through which liquid coolant is circulated to cool the plunger, the improvement wherein the uppermost portion of the mold defining the upper edge of the glass article lies on substantially the same level as the major portion of the upper edge of the flange portion of the plunger, a support for said plunger, means for mounting said plunger on said support, and heat insulating means interposed between said support and the major portion of the upper edge of the flange portion of said plunger so that substantially all heat flow is laterally through the flange portion and a minimum flow of heat occurs vertically of said flange portion to said support.

4. In an apparatus for forming a glass article having a base and a peripheral flange by pressing a plunger downwardly into contact with the gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, and means defining a chamber adjacent the internal surface of the base portion and flange portion through which liquid coolant is circulated to cool the plunger, the improvement wherein the upper edge of the flange portion of the plunger is formed with a portion extending upwardly beyond the uppermost part of the glass contacting area thereof, the upper edge of the glass contacting area of the mold lying on a level at least as great as the remainder of the upper edge of the flange portion radially inwardly of said upwardly extending portion, a support for said plunger, means for mounting said plunger on said support with the surfaces of the upper edge thereof in spaced heat insulating relationship to said support, and heat insulating means interposed between said support and the remainder of the upper edge of the flange portion of said plunger so that substantially all heat flow is laterally through the flange portion and a minimum flow of heat occurs vertically of said flange portion to said support.

5. In an apparatus for forming a glass article having a base and a peripheral flange by pressing, said apparatus including means for moving a plunger downwardly into contact with the gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, said mold having an uppermost portion extending radially inwardly to define the upper edge of the glass article, and means defining a chamber adjacent the internal surface of the base portion and flange portion through which liquid coolant is circulated to cool the plunger, the improvement wherein the uppermost portion of the mold defining the upper edge of the glass article lies on substantially the same level as the major portion of the upper edge of the flange portion of the plunger, a support having a flange, means for mounting said plunger on said support in such a manner that the flange portion of the plunger is adjacent the flange of the support, and insulating means interposed between said flange of said support and the major portion of the upper edge of the flange portion of said plunger such that substantially all heat flow is laterally through the flange portion and a minmum flow of heat occurs vertically of said flange portion through said support.

6. In an apparatus for forming a glass article having a base and a peripheral flange by pressing, said apparatus including means for moving a plunger downwardly into contact with the gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, said mold having an uppermost portion extending radially inwardly to define the upper edge of the glass article, and means defining a chamber adjacent the internal surface of the base portion and flange portion through which liquid coolant is circulated to cool the plunger, the improvement wherein the uppermost portion of the mold defining the upper edge of the glass article lies on substantially the same level as the major portion of the upper edge of the flange portion of the plunger, said plunger having a bead portion on the upper edge of the flange portion at the periphery thereof extending upwardly beyond the area of the mold which defines the upper edge of the glass article, the remainder of the upper edge of the flange portion of the plunger radially inwardly of said bead portion being on substantially the same level as the portion of the area of the mold defining the upper edge of the glass article, a support having a peripheral flange, means for mounting said plunger on said support with a portion of the flange of the support in spaced relation to the bead portion of the flange portion of the plunger, and heat insulating means interposed between said support and the remainder of the upper edge of the flange portion radially inwardly of said bead portion such that substantially all heat flow is laterally through the flange portion and a minimum flow of heat occurs vertically of said flange portion to the flange of the support.

References Cited in the file of this patent

UNITED STATES PATENTS

| | | |
|---|---|---|
| 297,062 | Brunt | Apr. 15, 1884 |
| 1,857,540 | Hardenberg | May 10, 1952 |

FOREIGN PATENTS

| | | |
|---|---|---|
| 501,865 | Great Britain | Mar. 7, 1939 |
| 3,275 of 1887 | Great Britain | Mar. 3, 1887 |